United States Patent [19]

Bruno et al.

[11] Patent Number: 5,413,032
[45] Date of Patent: May 9, 1995

[54] RESTAURANT TYPE GRIDDLE WITH MODULAR CONSTRUCTION AND WHICH IS LOAD SENSITIVE

[75] Inventors: Adrian A. Bruno, Rolling Meadows; William S. Schjerven, Sr., Schaumburg; Roberto Nevárez, Kirkland, all of Ill.

[73] Assignee: The Middleby Corporation, Ill.

[21] Appl. No.: 292,738

[22] Filed: Aug. 18, 1994

[51] Int. Cl.⁶ .......................... A47J 37/10; H05B 3/00
[52] U.S. Cl. ........................................ 99/331; 99/422; 219/436; 219/542; 392/435
[58] Field of Search ..................... 99/331–333, 99/325, 326, 330, 422–425; 219/436, 542, 461–465, 467, 476, 458, 540, 546, 548, 552, 442, 438; 392/435

[56] References Cited

U.S. PATENT DOCUMENTS

| | | | |
|---|---|---|---|
| 993,314 | 5/1911 | Mieth | 219/436 |
| 1,112,582 | 10/1914 | Whittlesey | 219/458 |
| 1,465,995 | 8/1923 | Pearson | 219/436 |
| 1,831,889 | 11/1931 | Skutta | 219/467 |
| 2,035,147 | 3/1936 | Dennis | 219/436 |
| 2,070,482 | 2/1937 | Hawkins | 392/435 |
| 2,119,421 | 5/1938 | Cross | 219/436 |
| 2,430,715 | 11/1947 | Grayson | 99/331 |
| 3,010,006 | 11/1961 | Schwaneke | 219/438 |
| 3,043,943 | 7/1962 | Moot | 219/468 |
| 3,047,702 | 7/1962 | Lefebvre | 219/458 |
| 3,231,718 | 1/1966 | Vasile | 99/422 |
| 3,245,462 | 4/1966 | Ramer | 219/436 |
| 3,317,709 | 5/1967 | Beasley | 99/422 |
| 3,479,490 | 11/1969 | Stark | 392/435 |
| 3,636,299 | 1/1972 | Stewart, Jr. | 219/443 |
| 3,674,983 | 7/1972 | Hurko et al. | 219/467 |
| 3,715,975 | 2/1973 | King | 99/331 |
| 3,739,148 | 6/1973 | Ryckman, Jr. | 99/422 |
| 3,809,859 | 5/1974 | Wells | 219/345 |
| 3,936,660 | 2/1976 | Blackwood | 99/422 |
| 4,017,967 | 4/1977 | Wells | 29/611 |
| 4,142,094 | 2/1979 | Barradas | 99/422 |
| 4,794,228 | 12/1988 | Braun, Jr. | 219/436 |
| 4,987,827 | 1/1991 | Marquez | 99/331 |

FOREIGN PATENT DOCUMENTS

| | | | |
|---|---|---|---|
| 2747553 | 4/1979 | Germany | 99/422 |
| 2247997 | 10/1990 | Japan | 99/422 |
| 228606 | 12/1943 | Switzerland | 219/443 |

Primary Examiner—Timothy F. Simone
Attorney, Agent, or Firm—Laff, Whitesel, Conte & Saret, Ltd.

[57] ABSTRACT

A multi-zone restaurant type of griddle is modularly constructed so that all maintenance may be done at the front of the griddle housing. The griddle plate is only three-eights of an inch thick with heat being spread uniformly by an aluminum plate in intimate contact with the bottom of the griddle plate. A thermocouple temperature sensing element is located at the bottom of a hole in the underside of the griddle plate so that the element is very near the cooking surface and is sensitive to the temperature of the load on the cooking surface, as distinguished from being sensitive to the temperature of the heating element below the griddle plate. With the modular construction, the front access, and light weight, all of the repairable parts of the griddle may be removed and replaced by one man as distinguished from most prior art griddles where two-man service teams were routinely required because they had to lift and invert a very heavy griddle which had a very thick steel griddle plate.

20 Claims, 5 Drawing Sheets

RESTAURANT TYPE GRIDDLE WITH MODULAR CONSTRUCTION AND WHICH IS LOAD SENSITIVE

This invention relates to griddles and more particularly to the kind of griddles that are used in restaurants, especially griddles for short order cooking.

A restaurant type of griddle may have almost any suitable length from two to eight feet, more or less. Usually, these griddles are arranged to have a plurality of heat zones, each about a foot wide and two feet deep. For example, one heat zone might be used for eggs, another for hamburgers, and yet another for pre-heating a food product to a temperature sustainable over a period of time so that the actual cooking time is sharply reduced after receipt of an order. Still, other zones may be provided for customized cooking.

The typical griddle has a massive steel plate in the range of one half to one and a half inches thick. In part, the massive nature of the steel plate has been required to reduce the thermal gradients between the heating source pathways and to prevent a griddle warping responsive to thermal expansion and contraction. This massive amount of steel provides a high level of thermal inertia and heat uniformity which lends itself to a very long time period for initial heat up or cool down. This slow response time prevents an efficient program for reduction of energy utilization during idle times. Moreover, the massive dimensions of the griddle cause the heat zones to bleed into each other so that the temperature in the hamburger zone, for example, spreads and bleeds over, perhaps a third of the egg zone with an unpredictable heat gradient in the area of the bleeding temperature.

When the thickness of the griddle is as massive as it conventionally is the thermostats which control the heating are so far removed from the cooking surface that the thermostat is sensitive to the heating element instead of to the load on the cooking surfaces. If, for example, ten hamburgers (perhaps frozen) are removed from the refrigerator or freezer and immediately placed on the hamburger zone of the hot griddle surface, there is an instant cooling at the cooking surface, which may not be reflected by the thermostat; or, if there is a response, it is only after an extended period of time caused by the thermal inertia of the massive griddle. Thus, the control over the evenness of the cooking temperature is very sluggish, at best. Beyond the obvious draw backs of uneven temperature, the quality of the food served to the customer may suffer.

A by-product of this sluggish response is that the expense on idle is much higher than it should be. For example, most customers begin arriving at a restaurant for lunch at, say, 11:30 am and stop arriving about 1:30 pm so that the heat supplied to the griddle should be reduced. Before and after these times, there may be only a very few people who expect to eat; however, the griddle can not cool appreciably because those people who do show up still expect to be fed fairly quickly. Therefore, there is a big waste of energy during idle conditions.

In addition to these problems relating to cooking, there are many practical problems relating to installing, maintaining, and living with a griddle having such a massive plate. When there is a need for maintenance, the weight of the conventional griddle plate inherently requires at least a two man maintenance team since the conventional griddle plate must be inverted for the maintenance. The heavy plate weighs too much for one man to lift.

One of the most important non-technical problems is to provide front serviceability. For example, in the prior art, if it is necessary to replace a griddle heating element, it can only be installed from the bottom or back. If it is necessary to go behind the griddle, it has to be set away from the wall with a resulting waste of floor space. Many other service problems may require access from other locations. It would be most desirable to simply fold down a front panel and to do all servicing from there.

Yet another problem relates to the amount of heat that is radiated into the environment surrounding the griddle. First, radiated heat is both wasted heat and wasted energy required to produce the heat. Second, the heat is very uncomfortable to the cook and to the other people who work in area. Third, the radiated heat imposes a higher burden upon air conditioning equipment for the restaurant. Fourth, when electric heating is used with a thick griddle plate, the wiring, fusing, etc. must be greater, thus creating higher installation costs. Moreover the rates for the consumed energy may be increased because the electric power company must install enough power generating equipment to adequately supply a surge in demand even if the surge never comes.

The BTU cost of gas is much less than the corresponding cost of electricity. Once the commitment is made to provide gas heat, the griddle plate automatically becomes thicker, and therefore, heavier than it would be for electric heat. The thicker plate exaggerates the above described problems, such as heat bleeding between zones and the like. For these and other reasons, many if not most, griddles are gas heated, while most cooks prefer the convenience of an electrically heated griddle.

Accordingly, an object of the invention is to provide a new and improved griddle which over comes the above described problems found in prior griddles. In particular, an object is to provide a quick response griddle which maintains even heat on the cooking surface. In this connection, an object is to place the thermal couple as close to the cooking surface as possible in order to make the griddle load responsive instead of heating element responsive. In particular, an object is to provide a plurality of well defined cooking zones with a minimum amount of heat bleeding across zone boundaries.

A further object is to initially provide a uniform heat source area so that a thick griddle plate is not required to achieve thermal uniformity.

Another object is to provide an efficient electrically heated griddle, with all of the advantages of electrical heat, but at or near a cost of gas heat. Here, an object is to enable a use of solid state, electronic controls which are able to maintain a high accuracy of heat control which can be preprogrammed, as for example, to automatically reduce energy consumption during idle conditions.

Yet another object of the invention is to provide an easily installed and maintained griddle which is completely serviceable from the front and which is completely modular so that parts may be replaced as a unit with a minimum amount of time and money. Accordingly, an object is to reduce down time to a minimum.

Still another object of the invention is to provide a better environment for short order cooking. This means a cooler and more comfortable kitchen, a reduced need for wiring and fusing, a reduced demand upon air conditioning, and a conservation of energy usage.

In keeping with an aspect of the invention, these and other objects are accomplished by providing a griddle having a relatively thin steel plate with a heat spreader for maintaining the uniformity of the heat distribution over each heat zone. The heat spreader replaceable modular heating element with an aluminum sheet in intimate contact with the bottom of the steel plate. The application of energy to the heating element is under control of a thermocouple located in a hole drilled into the steel plate to a depth which is so near the cooking surface that the control is load sensitive. The only constraint upon the closeness of the holes to the cooking surface is to prevent surface damage responsive to the habit of cooks to scrape the surface many times each day.

A preferred embodiment of the invention is shown in the attached drawings, in which.

Figure 1:
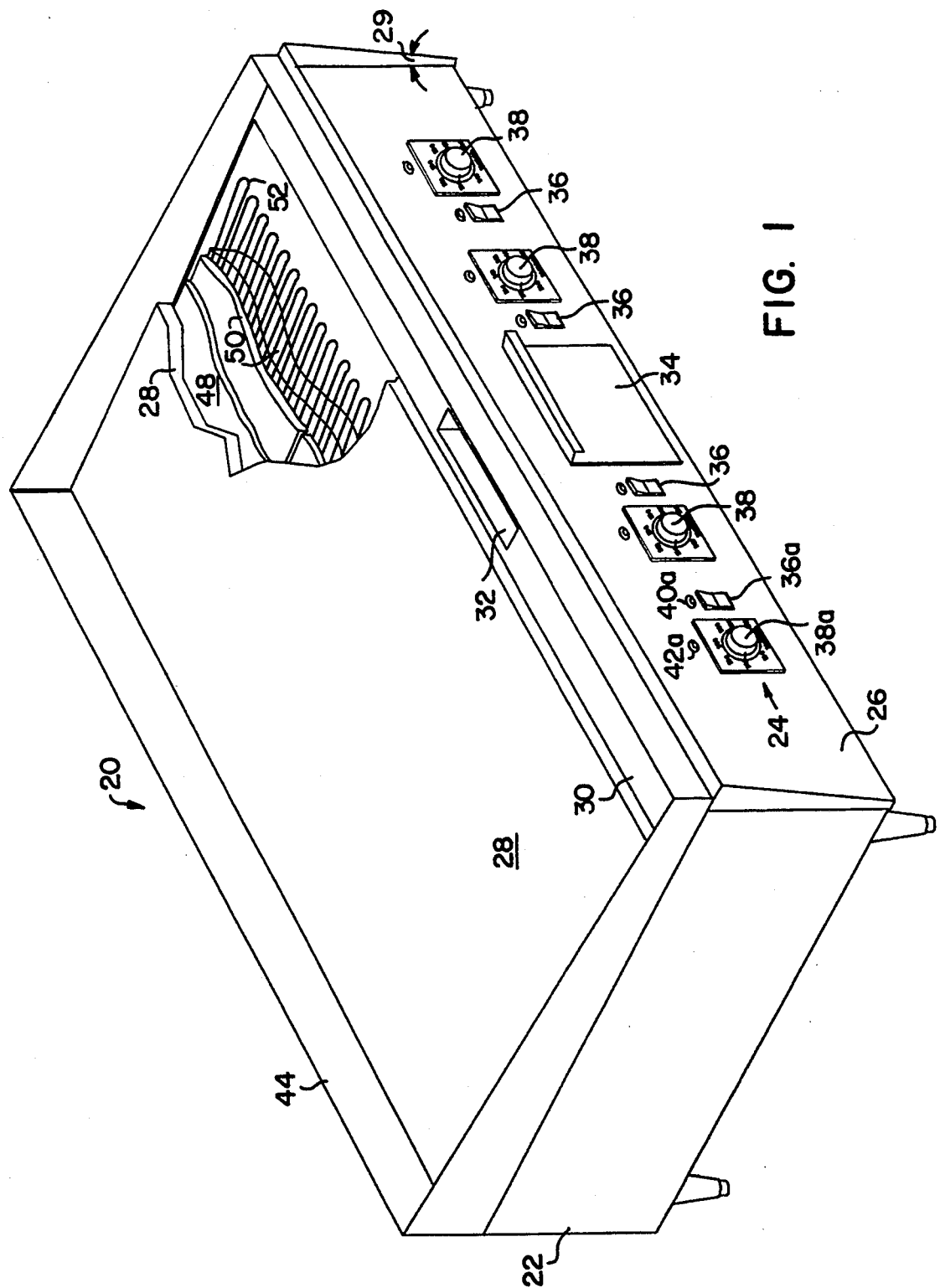
FIG. 1 is perspective view of the inventive griddle, partly broken away to show the construction of the griddle plate.

The inventive griddle 20 shown in FIG. 1, which will be sold under the trademark "ACCU-MISER", is a product of the Middleby Corporation. The trademark emphasizes the extreme accuracy of the heat control and the low cost of the energy demand.

The major parts of the inventive griddle are a housing 22, controls mounted on or in connection with a door 26 which may open or swing down for service and maintenance, and a steel plate 28 having a cooking surface on top of the housing. The door 26 sets at an angle 29 which makes it easier to see and set the controls. All normal service and maintenance that may reasonably be anticipated may be performed through the housing opening which is exposed when the door 26 is open. The cooking surface of steel plate 28 terminates on the front edge in a grease trough 30 having a grease chute or slot 32 therein. A removable drawer 34 catches the grease scraped off the cooking surface of plate 28 and through trough and chute.

The griddle shown in FIG. 1 may be made in any suitable length and with any suitable number of heating zones. As here shown, there are four heating zones, each having its own controls 36, 38. For example, the first or left hand heating zone has an on/off switch 36a, temperature selector switch 38a, and pilot lights 40a, 42a. Pilot light 40a indicates whether the zone heating unit is switched on or off. Pilot light 42a lights when the cooking surface temperature has reached the temperature selected by control knob of selector 38.

The steel griddle plate 28 is surrounded on three sides by a splash guard 44.

The inventive griddle plate has only to be thick enough so as not to warp responsive to repeated heating and cooling and to stand up to the relative rough usage experienced by almost all griddles. The construction of the griddle plate 28 is shown in FIG. 1 by broken sections.

On the top, there is a steel griddle plate 28 which is preferably three-eighth inch thick with upper and lower surfaces that are ground flat. Immediately under the steel plate 28 and in intimate contact therewith is a heat spreader in the form of an aluminum plate 48, which is one-eighth inch thick, for example. Aluminum is selected because it has one of the best heat conducting and spreading characteristics. Also, aluminum is soft relative to the hardness of steel and is given to cold flow, so that soon after it is installed, the upper aluminum surface soon adopts the shape of the bottom of steel griddle plate 28, filling in surface valleys and giving way to surface hills.

Beneath the aluminum plate 48 is a block 50 of aluminum silicate fiber 50 which is a material having a relatively poor heat transmitting characteristic and which is an electrical insulation. The top surface of block 50 is covered with a wear resistant surface 118 (see FIG. 9). Buried in a serpentine pattern within the block 50 of aluminum silicate is an energy efficient wire 52 which gives off heat when energized. Any suitable resistance wire may be used to heat the griddle. In one embodiment, the wire is made of nickel-chrome and is located in a plane within the aluminum silicate matrix at a level which is as close to the food as possible (considering a potential electrical hazard) in order to better direct heat in that direction.

Figure 2:
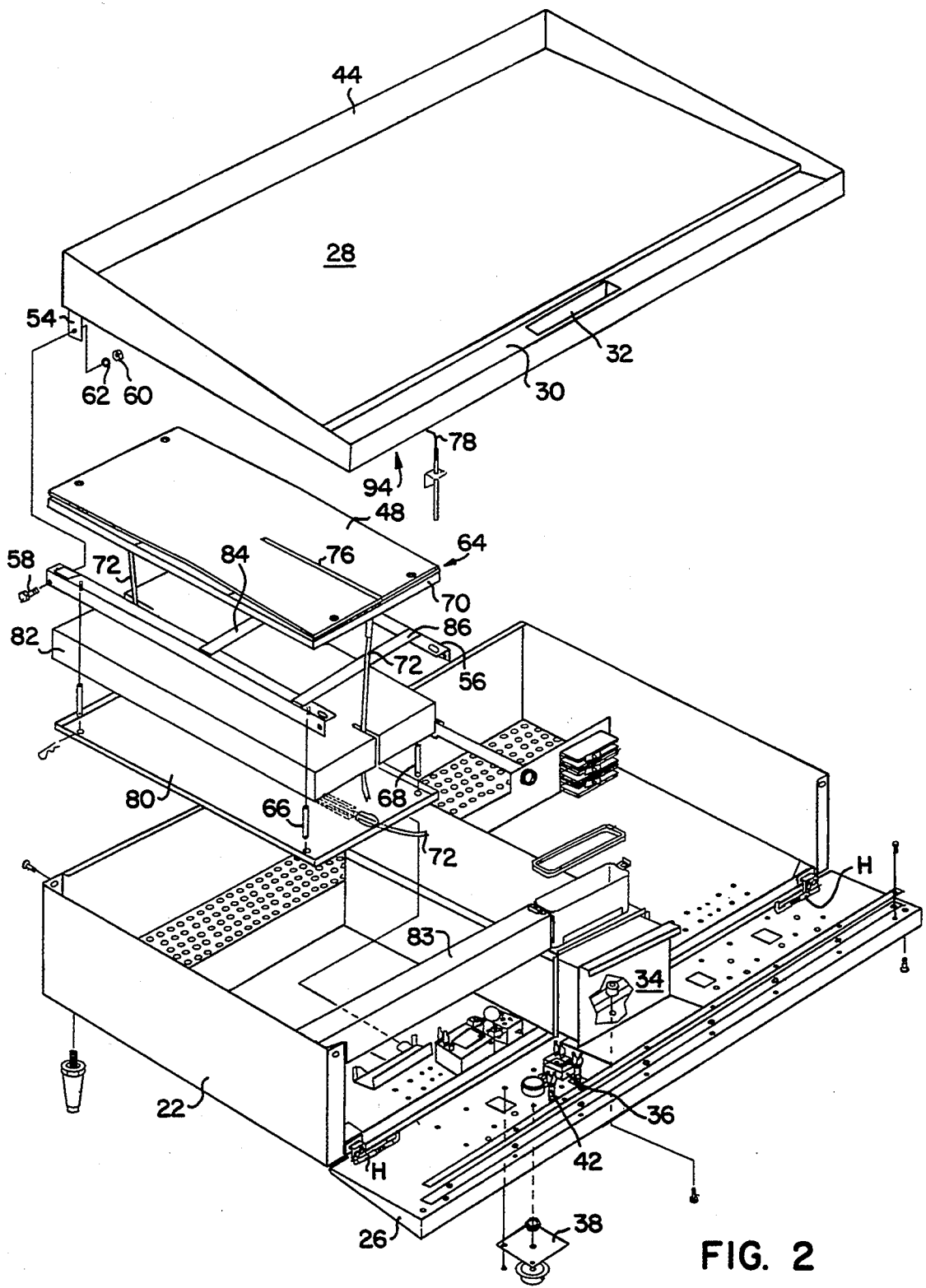
FIG. 2 is an exploded view of the inventive griddle.
Figure 3:
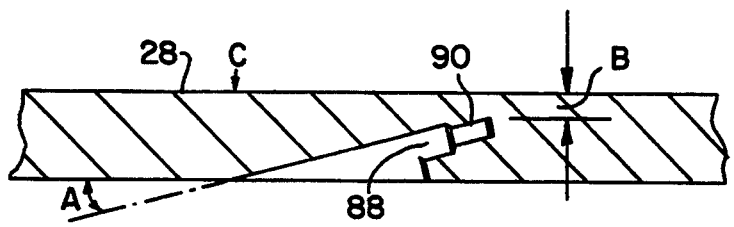
FIG. 3 is a cross section of steel griddle plate showing a coaxial pair of holes of different diameters for receiving a thermocouple.

The griddle assembly is best shown in the exploded view of FIG. 2. The steel griddle plate 28 is a separate unit which is attached to the housing 22. Dependent from the bottom, near the rear edge, and at opposite sides of the first heat zone of plate 28 are two lugs, one of which is seen at 54. Similar lugs are associated with each heat zone. An insulating blanket frame 56 is hinged to and between these two lugs by two screws (one of which is seen at 58) secured in place by a nut 60 and washer 62. Thus, the blanket frame 56 may swing up to an operating position or swing down to a service position.

The length of lug 54 is such that a heating module 64 fits snugly and exactly between blanket frame 56 and bottom of griddle plate 28 when the blanket frame swings up and is secured to the bottom of plate 28 by any suitable devices, such as bolts, represented at 66, 68.

The heating module 64 is enclosed within a sheet metal housing 70 which has the heat spreading aluminum plate 48 as the top surface. Enclosed within the housing are the aluminum silicate block 50, and heating wires 52. The electrical connections are made via wires 72 and a terminal block 74. Therefore, to install, replace, or change heat modules one only has to disconnect wires 72, remove bolts 66,68 or another suitable fastener, swing down the blanket frame 56, lift out the old heating module 64, insert a new heating module 64, swing frame 56 up to the capture position, reinstall bolts 66,68, and reconnect wire 72 from the new module to terminal block 74.

Figure 4:
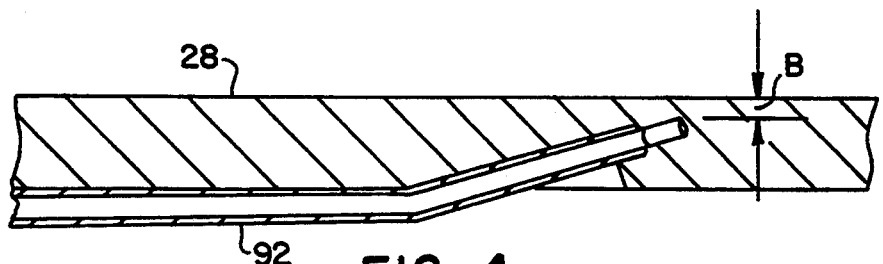
FIG. 4 is the same as FIG. 3, but with a stainless steel tube having an end in the larger hole, and a length welded to the bottom of the steel griddle.

When the blanket frame 56 is bolted into the capture position the aluminum plate 48 is in an intimate contact with the underside of steel griddle plate 28. The aluminum plate 48 includes a slot 76 for receiving a tube (FIG. 4) on the underside of the steel plate through which a thermocouple 78 is inserted.

The blanket frame 56 and an underlying plate 80 capture between them a blanket 82 of glass wool or another suitable heat insulating material which tends to prevent a loss of heat to the environment. A bar or strip of similar insulating material 83 completes the heat insulation. This construction directs heat toward the cooking surface of plate 28, keeps the work area cooler, reduces the need for restaurant air conditioning, and contributes to worker comfort, especially the cook's comfort.

The blanket frame 56 has cross bars 84, 86 which mate with members 120 (see FIG. 9) on the bottom of heating module 64. When the frame 56 swings up to the capture position, the mating of these module members 120 and frame cross bars 84, 86 insures that the heating member 64 is correctly positioned.

The installation and mounting of the thermocouple is shown in FIGS. 3–6. First, the steel plate 28 has a number of holes 88 drilled there in at an angle A, which may preferably be in the order of about 15°. Then a second hole 90 of a smaller diameter is drilled co-axially into the center of the first hole 88. The second hole is drilled to a depth which leaves a minimum unbroken thickness B of steel between the distal end of hole 90 and the top or cooking surface C of the steel griddle plate 28. It has been found that the distance B is best when it is equal to about 0.100 inches. The hole 90 should be drilled as far as possible in order to put the thermocouple as near as possible to the cooking surface C. On the other hand, the hole must not be drilled so far that the cooking surface C is damaged by the onslaught of cooks who almost constantly scrape the cooking surface C in order to remove any debris that remains clinging to the surface. Usually the scraping is with a strong spatula so that the cook may exert a relatively heavy force upon surface C.

A thin stainless steel tube 92 (FIG. 4) is inserted into the coaxial hole 88 with the largest diameter, bent over and welded to the bottom of the steel griddle plate 28. The tube 92 extends to the front edge 94 (FIG. 2) of the griddle plate 28. Therefore, when the door 26 is open, a maintenance man has easy access to the tube 92 at the front of the griddle for replacing the thermocouple.

Figure 5:
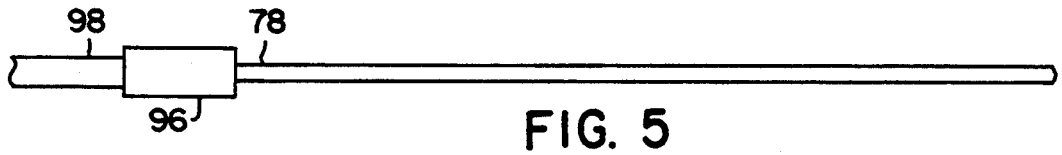
FIG. 5 is a side elevation of a thermocouple.

The thermocouple is shown in FIG. 5 as including a stainless steel tube 78 (about one-sixteenth inch in diameter) which is so very thin that it is very flexible. Connector 96 on the proximal end of the thermocouple tube 78 connects a wire 98 to a thermocouple inside the distal tip end of tube 78. The opposite end of wire 98 is connected to a solid state controller 100 (FIG. 2) which includes a potentiometer that is adjusted responsive to the sensed temperature.

Figure 6:
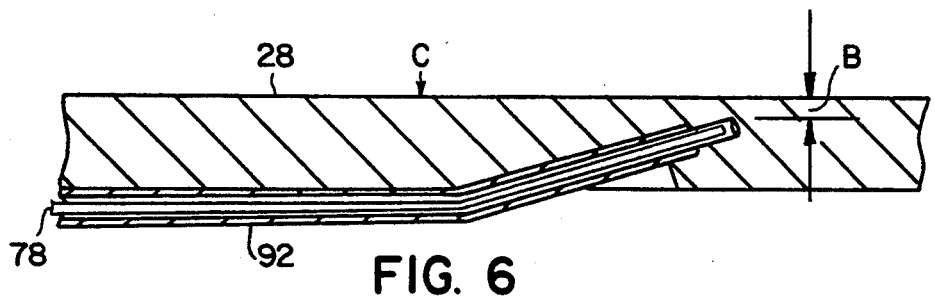
FIG. 6 shows the thermocouple of FIG. 5 in place in the tube and griddle of FIG. 4.

As shown in FIG. 6, the thermocouple is inserted through tube 92 until its distal tip end in intimate contact with steel griddle plate 28 (distance B, 0.100-inches from the cooking surface C).

Any suitable number of such thermocouples may be provided at any desired locations on the steel griddle plate 28. For the model shown in FIG. 1, there would be a minimum of four thermocouples, one associated with each of the four cooking zones and one associated with each of the corresponding control knobs 38.

Figure 7:
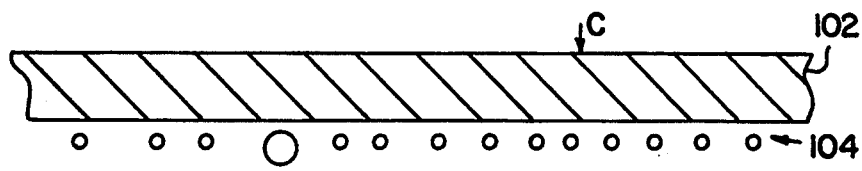
FIG. 7 is a cross section of a prior art griddle showing how the heating element and thermostat are usually installed.

This close and intimate contact between the cooking surface C and thermocouple 78 (FIG. 6) may be compared with the inefficient prior art technique (FIG. 7) where the steel griddle plate 102 is in the range of one half to one and a quarter inches thick. The prior art heating elements 104 are suspended below the griddle plate 102. Usually, they are a "Cal-Rod" burner positioned some distance away from the plate. The thermocouple 106 is generally in among these "Cal Rod" units on so that it tended to pick up the temperature of the burner and not the temperature on the cooking surface C of the griddle plate 102. Eventually, the griddle plate and burner reached thermal equilibrium; however, if a cook piles a number of cold, perhaps frozen, hamburgers on cooking surface C, for example, it cools the cooking surface while the thermocouple goes on indicating the temperature of the near by "Cal-Rod" unit 104, which does not cool, at least not for an extended time period. This inability to track temperatures at the cooking surface does not occur with the inventive thermocouple intimate contact with the cooking surface C (FIG. 6).

Figure 8:
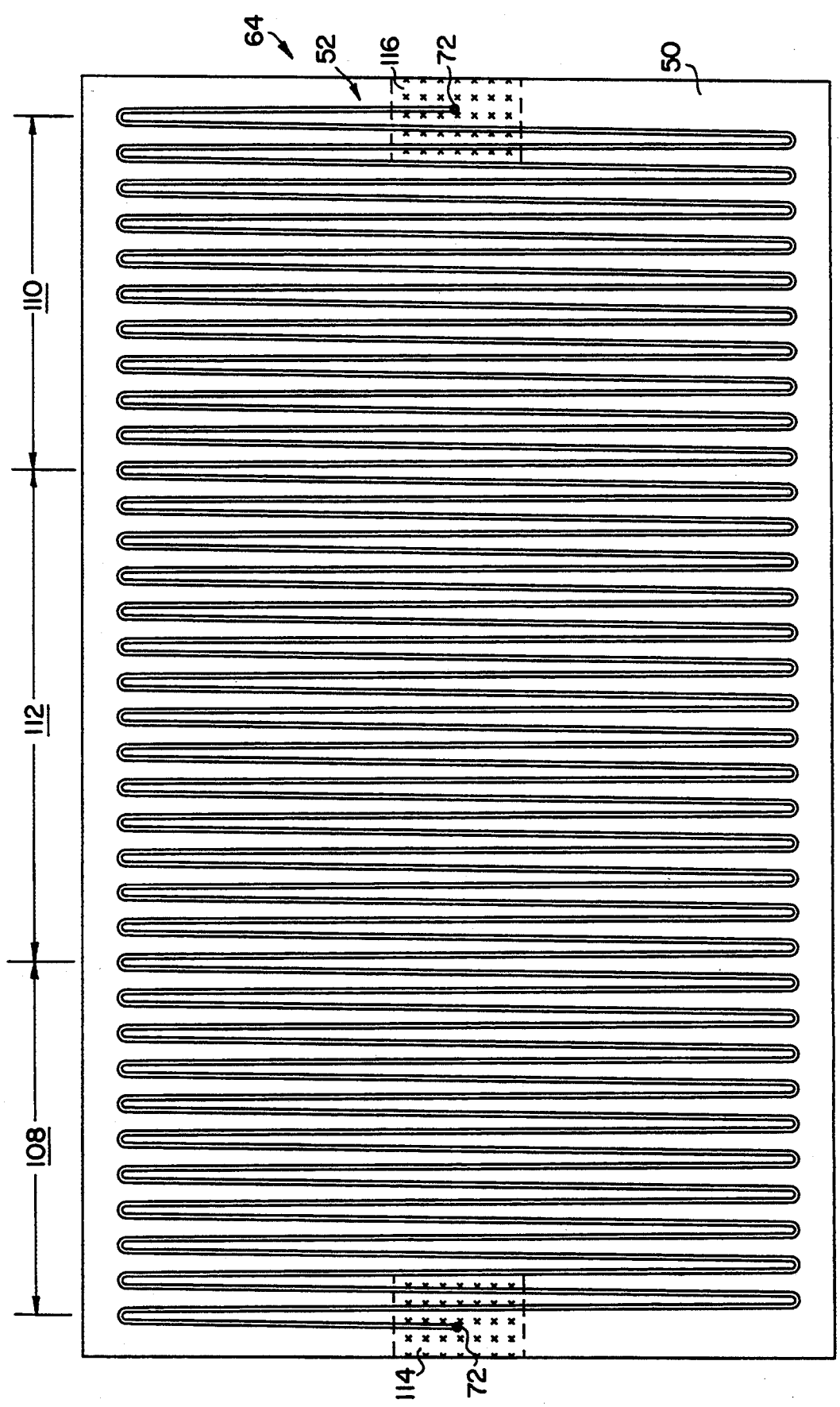
FIG. 8 is wiring plan showing how the inventive heating element wire is laid out.

The preferred wiring pattern for the resistance heating (nickel-chrome) wire 52 in the inventive heating element is best seen in FIG. 8. In the prior art most heating elements tended to extend along the length of the heating module 64 (front to back in FIG. 2). However, if the heating element is extended lengthwise, the thermally caused expansion and contraction of the heating rods or wires would destroy block 50 and the resultant anchorage of the heating wire. The invention solves this problem by running the wires in a serpentine pattern from side to side (across the narrow direction) of heating module 64.

Another reason for extending the wire 52 from side by side relates to the problems of heating the edges of the griddle. The front edge 94 (FIG. 2) is exposed to a natural cooling by ambient air which cooling would not be experienced in the middle of the griddle, for example.

At the side of the heating module 64, the plate is exposed to the heat of a different griddle heat zone. Thus, for example, the left edge of a middle heat zone on the griddle might be heated above the desired temperature by a migration of heat energy from the heat zone of the adjacent heating module. Likewise, the right edge of the same middle heat zone might surrender heat by a migration of heat energy to the heat zone on the right.

For these and similar reasons, in the invention, the resistance wire 52 follows a serpentine path wherein the wires which snake back and forth are spaced closer to each other in the two end zones 108, 110 of the heater than in the middle zone 112 of the heater. Accordingly, the wires 52 give off less heat energy in the middle zone which is surrounded by uniformly heated portions of the steel griddle plate 28. The wires 52 give off a more concentrated heat energy in the front and rear zones 108, 110. By carefully spacing the heating wires 52, the heat zone may be given a much more uniform heat than was available heretofore. Since it is an excellent conductor of heat, the aluminum plate 48 further helps to spread the heat evenly and thereby to provide the cooking surface with a greater uniformity of heat.

The wires 72 are connected from terminal block 74 (FIG. 2) to supply electrical energy to the nickel-chrome heating wires 52. The patches 114, 116 are preferably fiber glass fabric cemented to the top of the aluminum silicate block 50 in order to provide a mechanical resistance to abrasion from wires 72.

Figure 9:
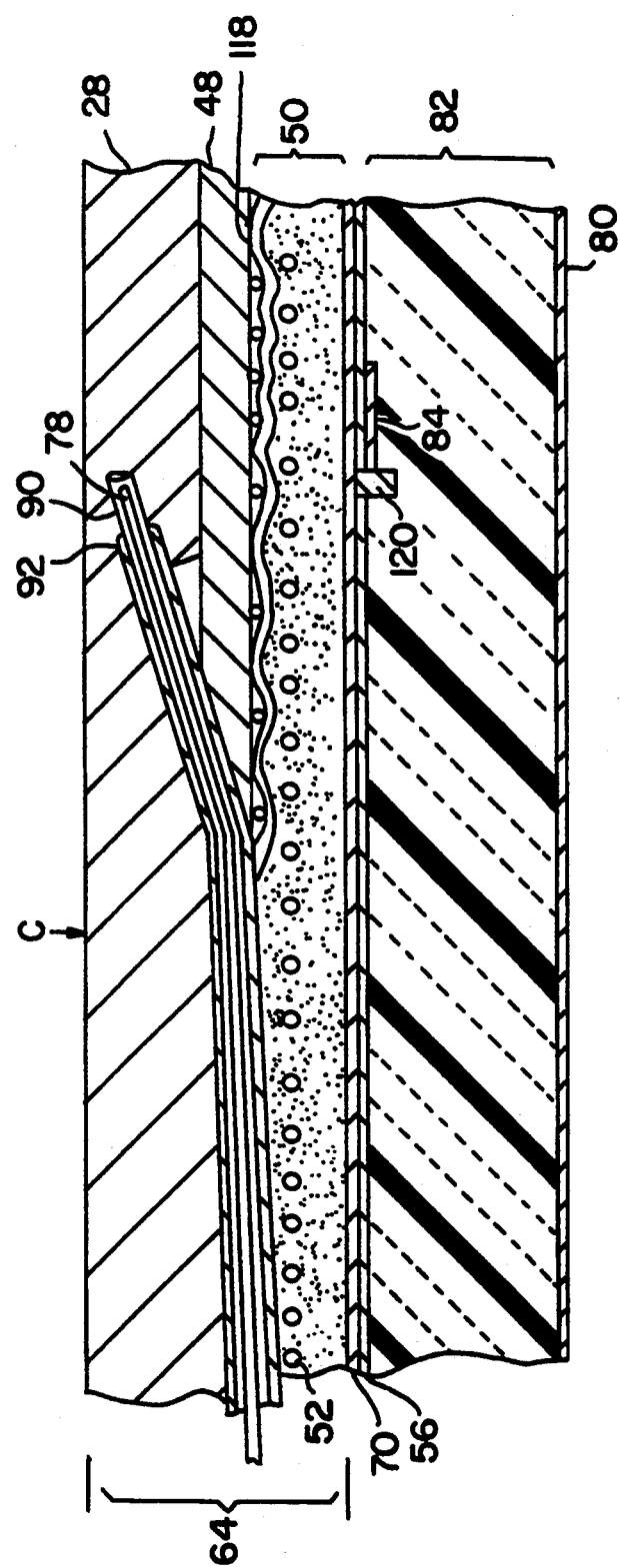
FIG. 9 is a cross section of the top of the griddle.

The cross section of the griddle top is seen in FIG. 9. On the top of a three-eighth inch thick steel plate is a smooth cooking surface C. A thermocouple 78 is buried very near cooking surface C within a coaxial pair of holes in the steel plate 28. Therefore, the monitored temperature is the temperature at the cooking surface C and not the temperature of some point below the bottom of plate 28.

The aluminum plate 48 is in intimate contact with the entire undersurface of steel griddle plate 28 (except for the location of the thermocouple). This intimate contact spreads the heat more uniformly before it reaches the steel griddle plate. Next to, and in intimate contact with the aluminum plate 48 is an aluminum silicate block 50 having nickel chrome or other resistance heating wires 52 embedded therein. These resistance wires are placed as near as possible to the aluminum heat spreading plate, considering the need for an adequate amount of electrical insulation that is required to avoid an electrical hazard. For mechanical strength and to protect the aluminum silicate block against abrasion, the upper surface of the block is covered by a fiber glass fabric 118. There is no need to so protect the bottom surface of the aluminum silicate block 50 because it is encased in a metal housing 70.

Below the aluminum silicate housing 70, a thick fiber glass wool blanket 82 provides thermal installation against the heat of the griddle. Blanket 82 is enclosed between a blanket frame 56 and a bottom plate 80. A cross member 84 is part of frame 56. The dependent tab 120 is attached to the bottom plate 70 of the housing encasing the heating module 64. When the heating module 64 is installed, the frame 56 can not be shut into the capture position unless the tab 120 is properly caught behind the cross member 84. If it is properly caught, the heating module is in perfect position.

The invention was found to found to have the following advantages:
quicker preheating
reduced energy usage on idle
quicker available heat on use
reduced weight
greater visibility and efficient control panel use
cooler temperatures for cook and environment
front serviceability
modular assembly The inventive griddle was able to maintain the desired temperature at any given point on the cooking surface within a very narrow temperature band width. Another important advantage is that the ability to use solid state controls which reduces the voltages in the working area to harmless low voltages, thereby enhancing safety in the working place.

Those who are skilled in the art will readily perceive how to modify the invention. Therefore, the appended claims are to be construed to cover all equivalent structures which fall within the true scope and spirit of the invention.

The claimed invention is:

1. A griddle comprising a griddle plate having a cooking surface on a top side of a steel plate, a second plate made of a metal having a good heat spreading characteristic in intimate contact with a bottom side of said steel plate, at least one heating module comprising a housing containing an electrically and thermally insulating block of material having electrically conductive heating element wires embedded therein, said second plate being a top member of said module housing and in intimate contact with said block of insulating material contained in said housing, and a blanket of thermal insulating material in close proximation with the underside of said block of insulating material.

2. The griddle of claim 1 and a wear resistant material covering at least one side of said block of heat conductive material.

3. The griddle of claim 1 wherein said second plate is made of aluminum.

4. The griddle of claim 1 wherein said block of heat conductive material is made of aluminum silicate.

5. The griddle of claim 1 wherein said heating element wires are made of nickel chrome.

6. The griddle of claim 1 and control means comprising a thermocouple extended through and embedded in at least one hole in an underside of said steel plate, said thermocouple being embedded in said steel plate close enough to said cooking surface to be load sensitive.

7. The griddle of claim 6 wherein said steel plate is about three-eighths of an inch thick and said thermocouple is approximately 0.100-inches from said cooking surface on the top of said steel plate.

8. The griddle of claim 1 wherein there are a plurality of said heating modules mounted in a side-by-side relation under said steel plate, and a plurality of said thermocouple elements embedded in said steel plate, each of said thermocouple elements being individually associated with a corresponding one of said heating modules, whereby there may be a plurality of individually controlled heat zones on said cooking surface.

9. The griddle of claim 8 wherein said griddle is enclosed in a griddle housing having a front door, and means for servicing and maintaining said griddle via an opening behind said front door, whereby said griddle may be serviced and maintained from the front and without having to invert said steel plate.

10. The griddle of claim 9 and solid state control means individually associated with each of said heating modules, an underside of said steel plate having at least one hole per heat zone drilled therein to a depth where ambient temperatures measured by said thermocouples are load sensitivity, a thermocouple tube extending from within each of said drilled holes to points near said front door, a plurality of said thermocouple elements, each of said thermocouple elements fitting into a corresponding one of said thermocouple tubes at said point near said front door and extending through said corresponding tube to said hole in said steel plate, a distal end of each of said thermocouple being in intimate contact within said hole in said steel plate and being close enough to said cooking surface to be load sensitive for the corresponding heat zone, and a proximal end of said thermocouple being connected to said solid state control means which is individually associated one of said heat heating modules.

11. The griddle of claim 10 wherein each of said blankets of heat insulating material is mounted in an individually associated blanket frame hinged to a location inside the back of said griddle housing, the front of each of said blanket frames swinging down and up, one of said heating modules fitting into and being captured in a space between the underside of said steel plate and a corresponding one of said blanket frames, one of said thermocouple tubes being located between said underside of said steel plate and a corresponding one of said heating modules when captured in said space.

12. The griddle of claim 11 wherein each of said heat zones has individually associated equipment, each of said equipments comprising said at least one hole, said thermocouple tube and thermocouple element, said heating module, said blanket and frame, and said solid state control means.

13. A modular restaurant type of griddle comprising a griddle plate having a multizone cooking surface, each of said zones having equipment individually associated therewith; each equipment comprising:
   a load sensitive means for detecting an instantaneous load sensitive temperature on said cooking surface in a corresponding one of said zones;
   a modular heating element means having a unitary construction with a cross section from top to bottom in the order named: a heat spreader means made of a material having a high thermal conductivity, a heating element in intimate contact with said heat spreader means, said heating element being a block of material having a high level of thermal and electrical insulating quality with heat producing wires laid out in a pattern to producing a uniform distribution of heat over said cooking surface, said wires being embedded in said insulating material and positioned close to said head spreader means;
   an insulation blanket in a blanket frame adapted to clamp said modular heating element means in intimate contact against a side of said griddle plate which is opposite said cooking surface; and
   solid state control means responsive to said load sensitive detecting means for automatically regulating the heat output of said modular heating element means.

14. The griddle of claim 13 wherein said griddle is in a housing with a front panel which opens to give access to said equipment, and means for servicing and maintaining all of said equipment via the opening which results when said front panel is opened.

15. The griddle of claim 14 wherein said load sensitive detecting means comprises a hole drilled at an angle into a bottom surface of said plate to a depth which is close enough to said cooking surface to enable a temperature sensor within said hole to detect temperature changes on said cooking surface which occur responsive to loading product onto said cooking surface, and means accessible entirely through said opening for installing and removing a temperature sensor into and from said hole, said temperature sensor being in intimate contact with said griddle plate when in said hole.

16. The griddle of claim 15 wherein said hole is a coaxial pair of holes of different diameters drilled at an angle of approximately 15° with respect to said bottom surface of said plate, an access tube in one of said coaxial holes having a larger diameter, said tube being attached to said bottom surface of said griddle plate and extending from said hole to said access means at said opening, and said temperature sensor being a second tube of a small diameter which fits through said access tube and into the coaxial hole having a smaller diameter, said temperature sensor being in said intimate contact with said griddle plate when in said smaller diameter hole.

17. The griddle of claim 16 wherein said heat spreader means is a plate made of aluminum, said thermal and electrical insulating material is aluminum silicate, and said wires are made of an electrically resistance material.

18. The griddle of claim 17 wherein said griddle plate is a steel plate about three-eighths of an inch thick and said aluminum plate is about an eighth of an inch thick.

19. The griddle of claim 17 wherein said insulating material is approximately three-eighths of an inch thick and said electrically resistance material is nickel chrome wires mounted in a plane approximately one third of the distance down from a top surface of said insulating material.

20. The griddle of claim 17 wherein a rear end of said blanket frame is hinged inside said griddle housing so that a front end of said blanket frame swings between down and up position, and said modular heating element means fits between said bottom surface of said griddle plate and said blanket frame when swung to the up position.

* * * * *